(12) United States Patent
Godwin

(10) Patent No.: US 9,515,465 B2
(45) Date of Patent: Dec. 6, 2016

(54) CONSTRUCTION SITE HANGING DEVICE AND USE THEREOF

(71) Applicant: Godwin Gear, Cheraw, SC (US)

(72) Inventor: Michael Benjamin Godwin, Cheraw, SC (US)

(73) Assignee: Godwin Gear, Cheraw, SC (US)

( * ) Notice: Subject to any disclaimer, the term of this patent is extended or adjusted under 35 U.S.C. 154(b) by 0 days.

(21) Appl. No.: 14/692,095

(22) Filed: Apr. 21, 2015

(65) Prior Publication Data

US 2016/0053936 A1     Feb. 25, 2016

Related U.S. Application Data

(60) Provisional application No. 62/982,111, filed on Apr. 21, 2014, provisional application No. 62/039,616, filed on Aug. 20, 2014.

(51) Int. Cl.
*F16M 13/00*     (2006.01)
*H02G 3/00*     (2006.01)
*H02G 3/32*     (2006.01)

(52) U.S. Cl.
CPC . *H02G 3/00* (2013.01); *H02G 3/32* (2013.01)

(58) Field of Classification Search
CPC ........ F16M 13/04; F16M 13/022; H02G 3/00; H02G 3/32
See application file for complete search history.

(56) References Cited

U.S. PATENT DOCUMENTS

| | | | |
|---|---|---|---|
| 6,749,156 B1 * | 6/2004 | Buehlmeyer | E04D 13/0722 248/48.1 |
| 7,530,329 B1 * | 5/2009 | Paris, Sr. | A01K 1/0356 119/61.57 |
| 9,060,467 B2 * | 6/2015 | Nee | A47G 7/045 |

* cited by examiner

*Primary Examiner* — Amy Sterling
(74) *Attorney, Agent, or Firm* — Dority & Manning, P.A.

(57) ABSTRACT

A device that can be removable secured inside a metal stud at a construction site is described. The device can include a securement device such as a hook that can hang/support tools at the job site such as electrical cords. Installing the inexpensive hanging device at a desired elevation in a few seconds can improve safety at a construction site and can protect tools from damage due to placement on the floor or on an unstable perch.

10 Claims, 9 Drawing Sheets

CONSTRUCTION SITE HANGING DEVICE AND USE THEREOF

PRIORITY INFORMATION

The present application claims the benefit of and priority to U.S. Provisional Patent Application Ser. No. 61/982,111 titled "Plastic Device That Locks Inside a Metal Stud With a Hook To Hang Items" of Godwin filed on Apr. 21, 2014, and to U.S. Provisional Patent Application Ser. No. 62/039,616 titled "Construction Site Hanging Device and Use Thereof" of Godwin filed Aug. 20, 2015, the disclosures of which are incorporated herein by reference.

BACKGROUND

During the construction of a building or other structure, placement of tools and machines used during the work can often present safety hazards. For example, extension cords are often utilized to provide power for tools and lighting, and are generally run along the floor or across the ground of the site. This can present many dangers as extension cords may be run through standing water, causing an electrocution danger, and present a tripping hazard to workers. Moreover, laying extension cords across the ground or floor can lead to damage to the cords themselves, as structures on the floor/ground over which the cords are stretched can cut or damage the cord, and the cords can be run over by machinery, which can also damage the cord.

Currently, most contractors continue running electrical cords on the ground because it is costly and time consuming to attach them to walls or roughed in structures. Contractors have also been known to use zip ties, wire, and rope to tie off extension cords. Unfortunately, zip ties are single-use devices, which causes unnecessary expense and waste, wire can damage the cords and can present electrical dangers, and rope can be large and unwieldy, with the end of the rope itself often remaining on the ground, which still presents safety issues with regard to tripping.

Other tools and devices commonly used on construction sites also present placement difficulties as there is no safe, stable place to hold them during use. For instance, flashlights must be either held (requiring loss of the use of a hand or an additional helper for holding the light), or perched in a location where the light can be used. Similarly, when utilizing more than one tool on a project, tools not immediately being used must often be either perched precariously on a nearby ledge or set on the floor, where they are difficult to retrieve. Loosely setting a tool on a perch often leads to damage to the tool, as it can easily roll or fail off of the perch.

Information-containing papers and devices such as plans, notes, tablet computers, laptops, etc. are also difficult to safely use on a construction site, as they must be similarly perched precariously on a nearby ledge or placed on the floor, making them making them subject to damage and difficult to read.

What are needed in the art are devices that can be easily attached and detached at a useful height at a construction site and that can hold or support devices and tools (e.g., electrical cords, flashlights, laptops, etc).

SUMMARY

According to one embodiment, disclosed is a construction site hanging device that includes a grabber component. More specifically, the grabber component includes a first width and a second width. The first width is less than an inside dimension between two flanges of a metal stud, and the second width is greater than the inside dimension between the two flanges of the metal stud. The grabber component is rotatable between the flanges and is removably securable between the flanges, for instance via a friction fit.

During use, the grabber component can be removably secured between the flanges of a metal stud at any useful height. The grabber component can also be attached to a securement device and/or an attachment device, such as a hook, a bolt, a clamp, or the like, that can be used to support or grasp a tool or a machine. For example, the grabber component can be attached to a hook securement device that can be used to hang/support electrical cords such as extension cords at a safe and useful height.

BRIEF DESCRIPTION OF THE FIGURES

A full and enabling disclosure of the present invention, including the best mode thereof, directed to one of ordinary skill in the art, is set forth in the specification, which makes reference to the appended figures, in which.

Figure 1:
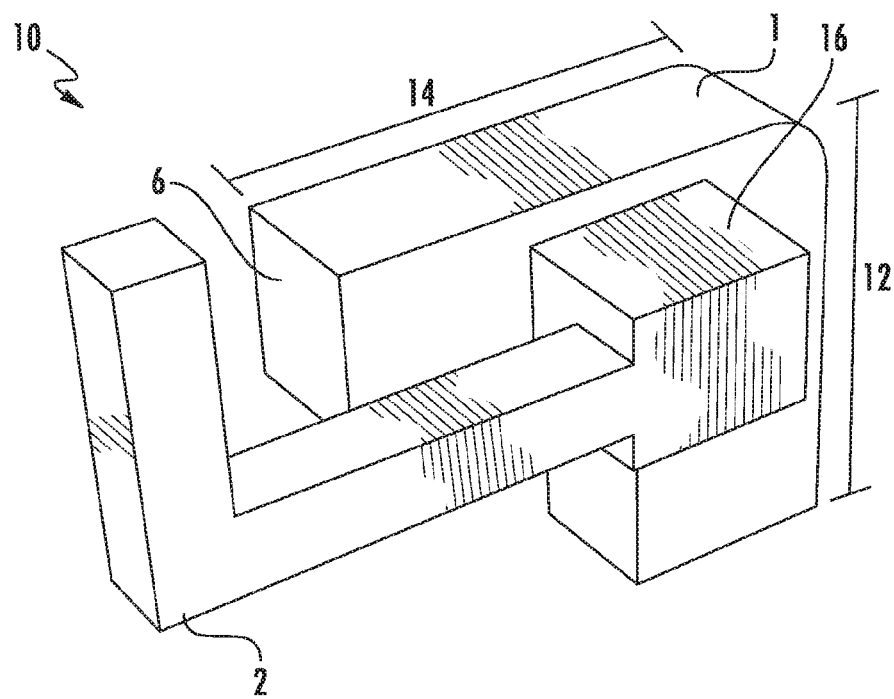
FIG. 1 is a perspective view of one embodiment of a hanging device.

Repeat use of reference characters throughout the present specification and appended drawings is intended to represent same or analogous features or elements of the invention.

DETAILED DESCRIPTION

Reference now will be made in detail to embodiments of the disclosed subject matter, one or more examples of which are illustrated in the drawings. Each example is provided by way of explanation of the subject matter, not limitation thereof. In fact, it will be apparent to those skilled in the art that various modifications and variations can be made to the presently disclosed subject matter without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

The present disclosure is generally directed to a device for use at a construction site that can be used to hang or support tools or other machines. For example, in one embodiment, the hanging device can be used to support electrical cords, and in one particular example, extension cords. Use of the device can provide a route for electrical cords (and other items) to be held/supported in the air during the construction process and can eliminate hazards associated with leaving devices on the ground, perching devices unsupported in the construction site, or attempting to hold devices during use that otherwise would not be held. The device is simple and rugged reusable, inexpensive, and dependable.

Through use of the disclosed hanging devices tools, papers, electronic devices, and so forth, can be secured at a desired elevation in a few seconds. Beneficially, the hanging device includes a grabber component that can securely lock into any desired spot on a metal stud as is commonly utilized in construction. In addition, the hanging device can include a securement device such as a hook or other securement attachment that can be used to secure or hang electrical cords or other items.

Figure 2:
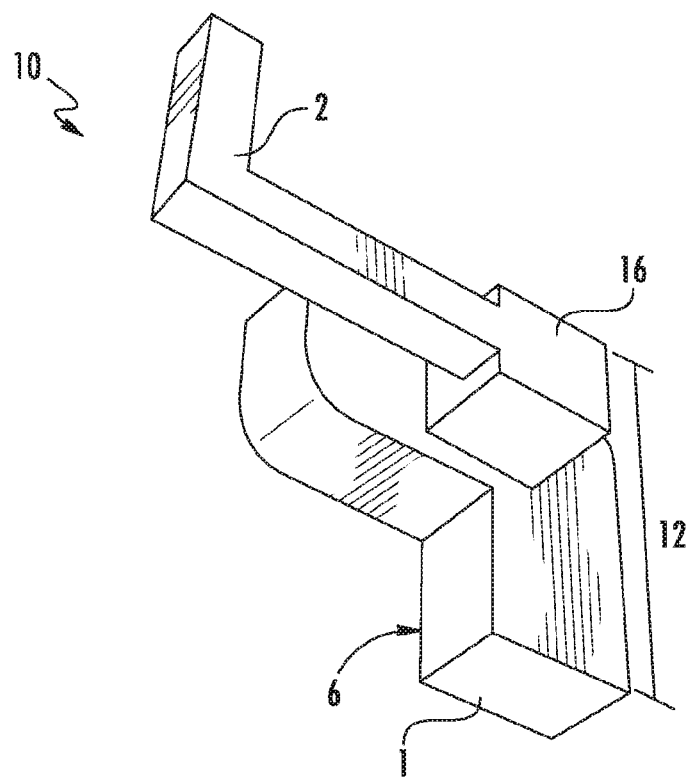
FIG. 2 is another perspective view of the hanging device of FIG. 1.

Referring to FIG. 1, one embodiment of a hanging device 10 is illustrated in a perspective view generally from the top of the hanging device 10. FIG. 2 illustrates the hanging device 10 in another perspective view, generally from the bottom of the hanging device 10. The hanging device 10 includes a grabber component 1 that in this embodiment is shaped like the letter 'L.' The shape of the grabber component is not required to be in any particular shape, and in other embodiments, it can have other shapes such as rectangular, oval, etc.

Figure 3:
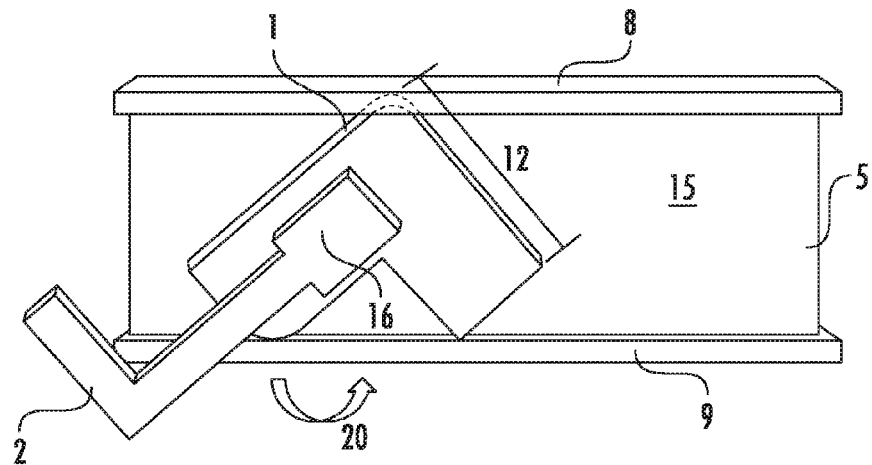
FIG. 3 illustrates the hanging device of FIG. 1 during securement of the device between the flanges of a stud.

The grabber component 1 has a first width 12 and a second width 14. The first width 12 is just under the width between the flanges 8, 9 of a stud 5 (FIG. 3, FIG. 4). This allows for the back surface 6 of the grabber component 1 to be placed against the surface 15 of a metal stud 5 and between the flanges 8, 9.

The second width 14 of the grabber component 1 can be slightly wider than the inside dimension between the flanges 8, 9 of the stud 5. Upon rotating the grabber component 1 between the flanges 8, 9 of the stud 5, as shown by the directional arrow 20 in FIG. 3, the grabber component can be secured into the stud by force of friction that can be enough to hold the hanging device between the flanges and within the stud.

The hanging device 10 also includes an attachment structure 16 and a hook 2. The attachment structure 16 and a hook 2. The attachment structure 16 and the hook 2 can be either permanently or removably attached to the grabber component 1 as discussed further herein. The hook 2 can be used to hold or hang a device at a construction site. For instance, a hook 2 can be used to support an electrical cable such as an extension cord.

Figure 4A:
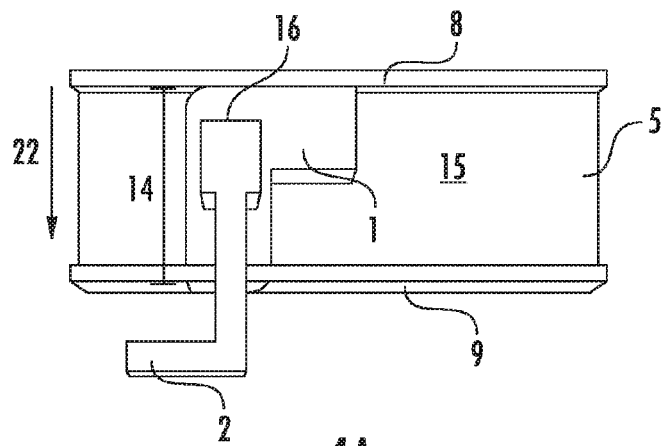
FIG. 4 illustrates the hanging device of FIG. 1 following securement of the device between the flanges of a stud in a horizontally placed stud (FIG. 4A) and in a vertically placed stud (FIG. 4B).

When weight is applied to the hanging device 10, for instance by hanging an electrical cord on the hook, the downward force can pull the hanging device down. The additional weight of a tool/device/etc. that is hung on the hook 2 can pull the hanging down as illustrated by the directional arrow 22 in FIG. 4A, which can merely serve to pull the hanging device 10 more tightly against the flange 9 of a horizontally placed stud 5 as illustrated in FIG. 4A.

Figure 4B:
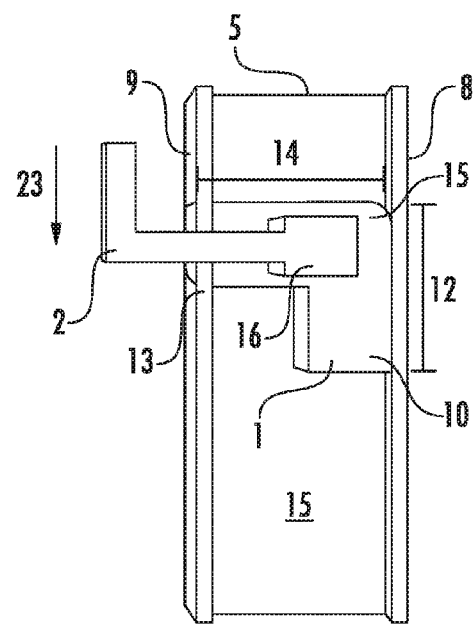

When considering a vertical flange 5 as illustrated in FIG. 4B, the additional weight of a device that is hung or supported on the hook 2 will place a rotational force on the hanging device 10 due to the downward force only on one side of the device as illustrated by the directional arrow 23 in FIG. 4B. However, as the distance between corner 13 and corner 15 of the grabber component 1 is greater than the width 14 of the grabber component 1, the hanging device 10 will still be securely held in place up to a relatively high weight under the rotational force and the moment caused by the downward force 23. Accordingly, the hanging device 10 can support a considerable amount of weight, for instance about 5 pounds or less, or about 3 pounds or less in some embodiments.

Figure 5:
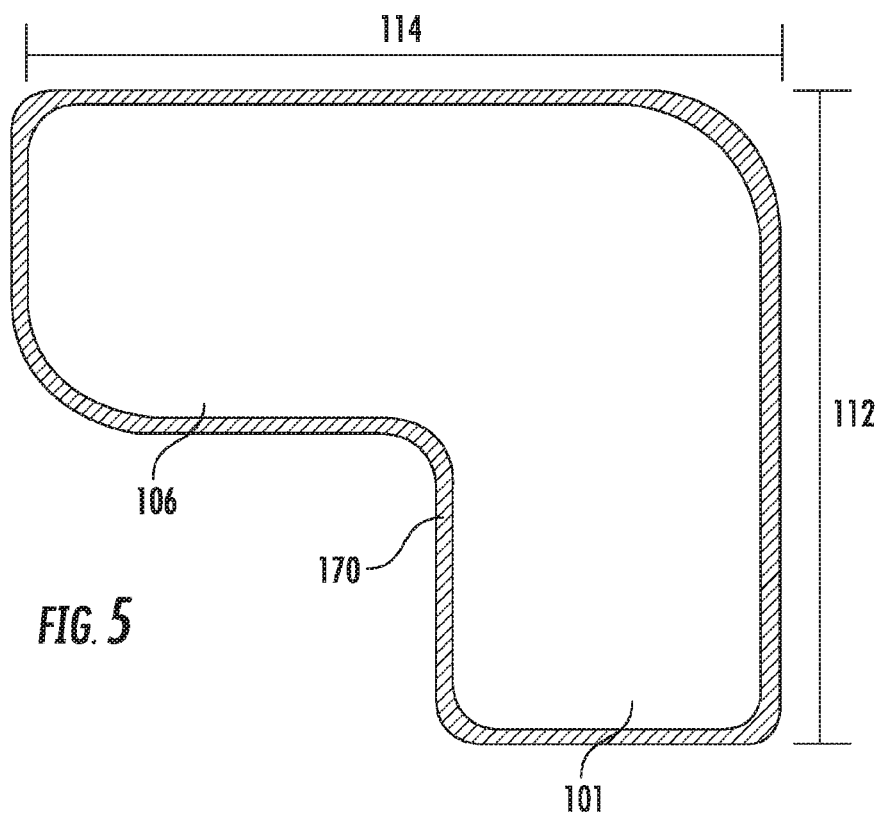
FIG. 5 is a front view of a grabber component of a hanging device.
Figure 6:
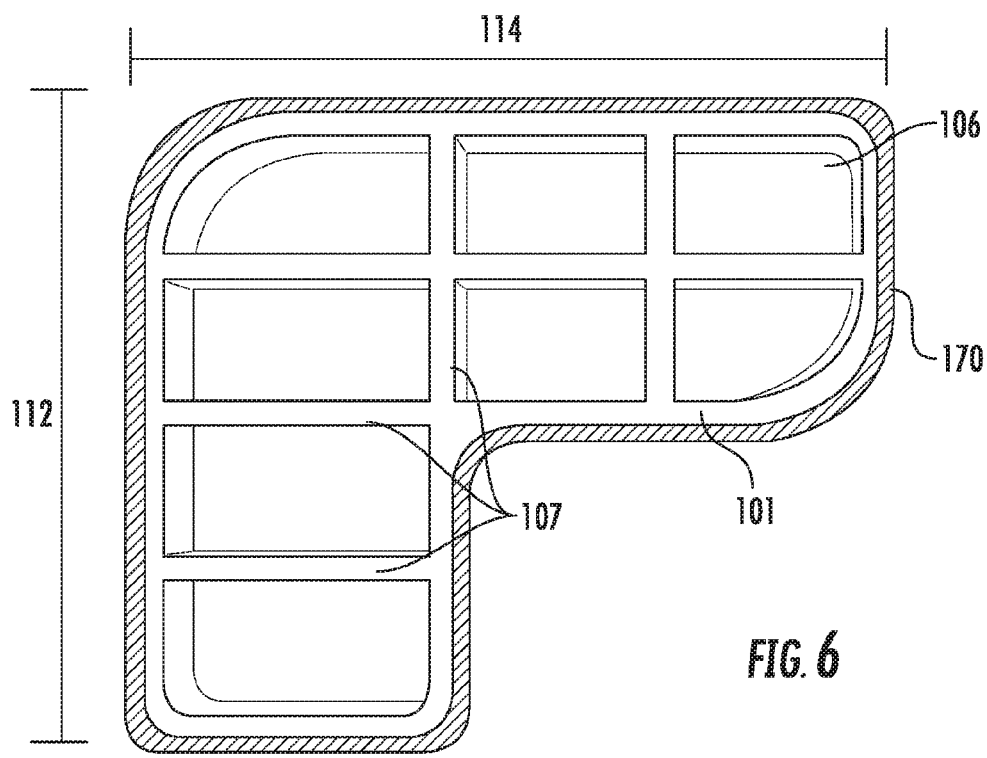
FIG. 6 is a back view of a grabber component of a hanging device.

FIG. 5 and FIG. 6 illustrate the front (FIG. 5) and back (FIG. 6) of another embodiment of a grabber component 101. As can be seen, the corners of the grabber component 101 are more rounded as compared to the grabber component 1 of FIGS. 1-4.

Grabber component 101 has a first width 112 and a second width 114, as illustrated. The first width 112 can be slightly less than the width between the flanges of a stud, as discussed above. For example, the first width 112 can be from about 2.5 inches to about 3.5 inches, or about 3 inches in one embodiment. The second width 114 can be at or greater than the width between flanges of a stud. For example, the second width 114 can be from about 3.0 inches to about 4.5 inches, or from about 3.4 inches to about 3.8 inches, or from about 3.5 inches to about 3.6 inches in one embodiment. Beneficially, the hanging device can be relatively inexpensive to make, and as such can be formed to fit between the flanges of any sized metal stud.

The grabber component 101 can also include cross pieces 107 that can strengthen the device. The cross pieces 107 can generally be molded in conjunction with the remainder of the grabber component 101. By way of example, the grabber component 101 can be injection molded of a suitable polymeric material, though injection molding is not a required formation method, and a grabber component 101 as well as the remainder of a holding device, can be formed according to any suitable method.

In general, the grabber component 101 of a holding device can be formed of a polymeric material that can provide a small amount of deformation during placement of the device in a stud, but can support a tool or device without permanent deformation. For example, a polymeric material including a thermoplastic polymer such as polyvinyl chloride, a polyolefin (e.g., polyethylene, polypropylene, etc.) or an engineering polymer such as a polyarylene sulfide, a liquid crystal polymer or the like can be utilized, as well as blends and copolymers as are known in the art.

In one embodiment, a holding device can be formed of multiple different polymeric materials. For example, a device can include a deformable elastomer material on a surface of the device that engages with a metal stud, which can increase the friction hold between the device and the metal of the stud. For example, a rubber (e.g., latex rubber, a block copolymer rubber such as styrene-butadiene-styrene rubber, etc.) layer 170 can be located in a continuous or non-continuous around the outer surface 106 of a grabber component 101. Upon securing the grabber component 101 within the flanges of a metal stud, the rubber layer 170 can contact the metal of the stud, and can be deformed by the contact pressure, which can improve the hold between the grabber component 101 and the metal stud.

A polymeric composition used to form the device can include one or more polymers in conjunction with additives as is known. By way of example, a polymeric composition can include an additive such as a fibrous additive that can strengthen the composition as well as plasticizers, colorants, impact modifiers, nucleators, etc. Additives can generally be included in a polymeric composition in standard amounts as are known in the art. In one embodiment, the device can include colorants to form the device in a particular color, such as orange, which is commonly utilized to form safety devices used at construction sites.

Figure 7:
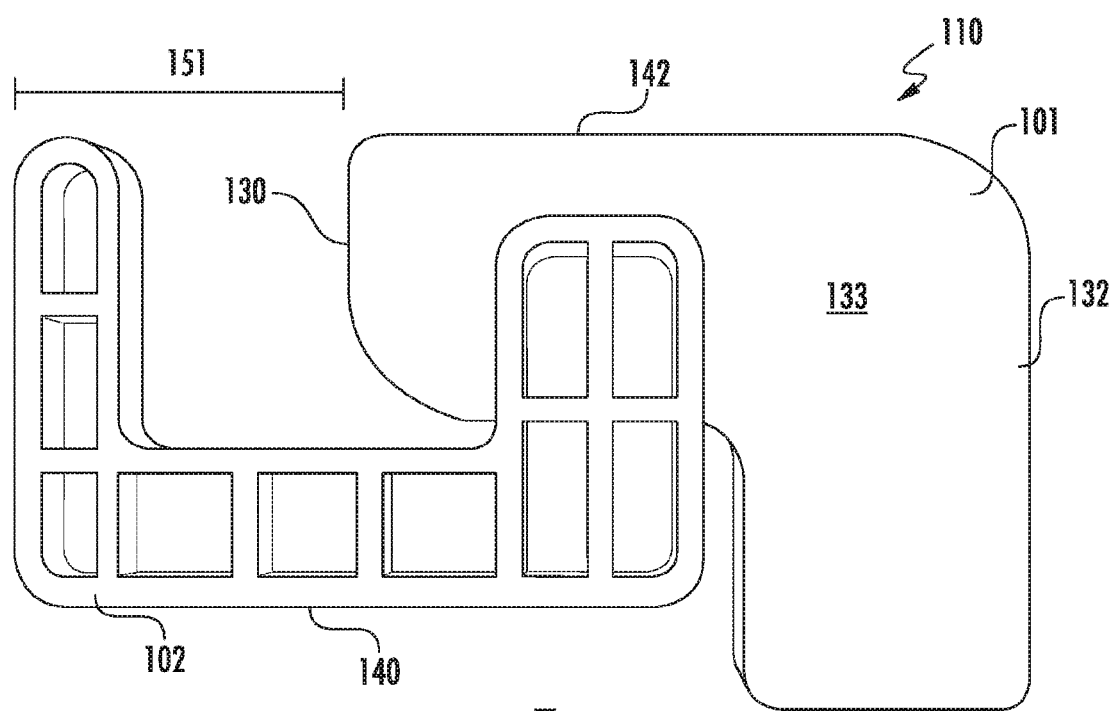
FIG. 7 is a front view of a hanging device including a grabber component attached to a hook for supporting a construction site tool or device.
Figure 8:
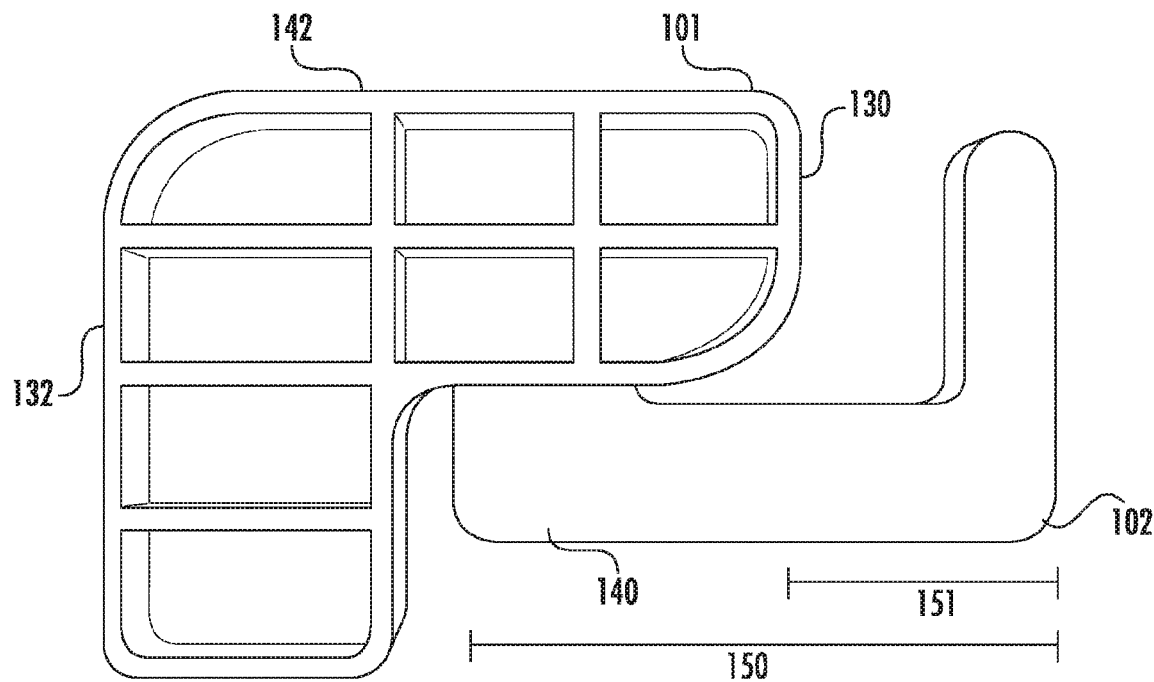
FIG. 8 is a back view of a hanging device including a grabber component attached to a hook.

FIGS. 7, 8, 9, 10, and 11 illustrate another embodiment of a hanging device that includes a grabber component 101 as illustrated in FIG. 5 and FIG. 6 in conjunction with a securement device, in this embodiment a hook 102. FIG. 7 illustrates a front view of the hanging device 110. The hook 102 includes a series of cross pieces 107 that can strengthen the device, as with the cross pieces of the grabber component 101 illustrated in the back view of the device 110 in FIG. 8.

The hook 102 can be formed of the same or different material as the grabber component 101. In one embodiment, the device can be monolithic and formed in a single molding process and the hook 102 can a non-removable section of the device 110. Alternatively, the hook 102 (or other securement device) can be removably attachable to the grabber component 101 and can be formed of the same or a different material as the grabber component 101.

As shown, the grabber component 101 can include a first surface 130 and a second surface 132. Upon attachment of the device 110 to a stud, the two surface 130, 132 will press against the two flanges on either side of the stud. The hook 102 can extend beyond the first surface (FIG. 8) so that it will likewise extend out from the side of a metal stud (more clearly seen in FIG. 13D) and be available for supporting a tool or other device. For example, a securement device such as a hook 102 can have an overall length 150 of from about 3 inches to about 5 inches, or from about 3.25 inches to about 3.5 inches, or about 3.3 inches in some embodiments and can extend beyond the first surface 130 of a grabber component by a distance 151 of from about 0.5 inches to about 2 inches or from about 1 to about 1.5 inches in some embodiments.

Device 110 can also include an attachment structure 116 that extends from the front 133 of the grabber device and attaches to as securement device or alternatively attaches directly to the tool or machine to be held/supported by the hanging device. For instance, the attachment structure can attach to the hook 102. The attachment device 116 can provide for an offset 153 between the grabber device 101 and the hook 102 such that upon attachment to the stud, the hook 102 extends out from the front of a metal stud (more clearly seen in FIG. 14). For instance, offset 153 can be about 1 inch or less, about 0.5 inches or less, or about 0.25 inches in some embodiments. In the embodiment of FIG. 7-11, the attachment structure 116 is unitary with both the hook 102 and the grabber component 101, but this is not a requirement of the hanging device. An attachment structure can be unitary with either or both of the grabber component and the securement device or alternatively, all three components can be removably attachable to one another.

Figure 9:
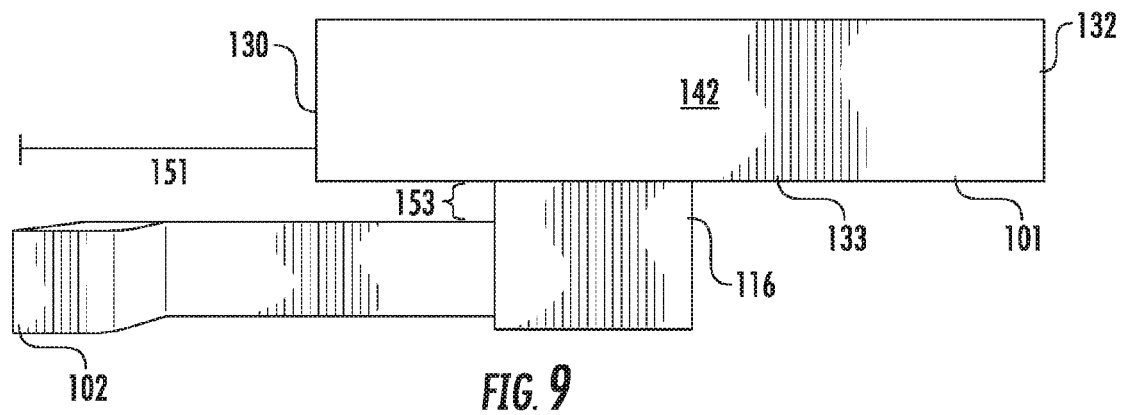
FIG. 9 is a top view of a hanging device including a grabber component attached to a hook.
Figure 10:
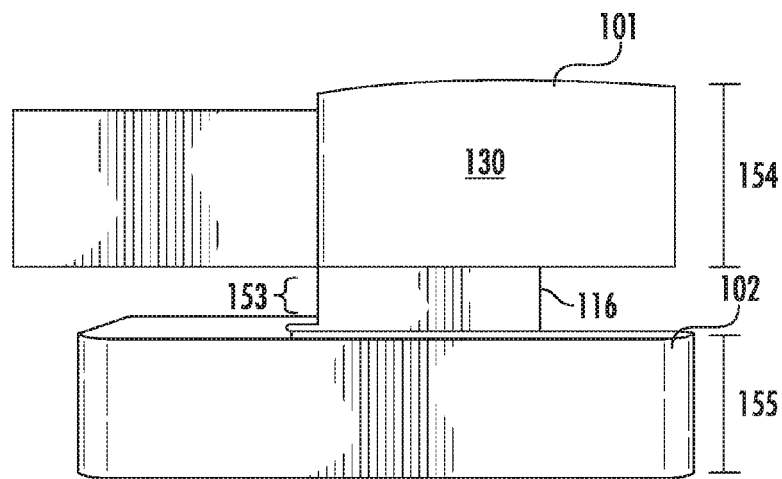
FIG. 10 is a first end view of a hanging device including a grabber component attached to a hook.
Figure 11:
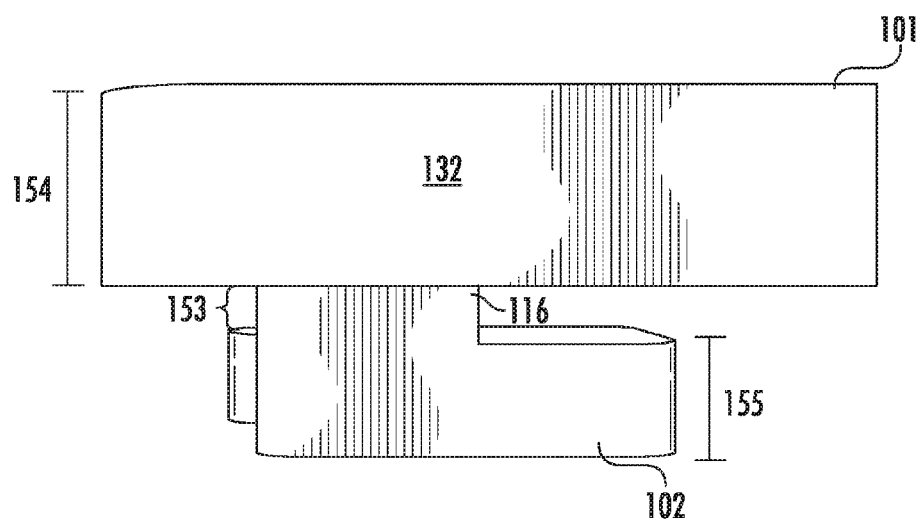
FIG. 11 is a second end view of a hanging device including a grabber component attached to a hook.

FIG. 9 is a top view of the device 110, FIG. 10 is a first end view of the device 110 and FIG. 11 is a second end view of the device 110. While the device 110 includes the hook 102 with the base surface 140 of the hook generally parallel to the top surface 142 of the grabber component, this is not a requirement of a device, and the hook may be angled with respect to the grabber component. In addition, a hook may have any suitable shape, such as a more rounded 'U' shape and can be designed for supporting any device or tool.

The dimensions of the grabber component and the securement device can vary depending upon the size of the stud to which the hanging device will be removably attached, the particular securement device attached to the grabber component, the size and weight of the device to be held/supported by the hanging device, etc, By way of example, the width 154 of the grabber component 101 can generally be from about 0.5 inches to about 1 inch, with variation depending, for instance, on the depth of the metal stud within which the grabber component 101 can be set. The securement device such as hook 102 can have a width 155 of from about 0.25 inches to about 0.5 inches, though the overall size of a securement device can depend upon the specific application for which the securement device is intended.

Figure 12:
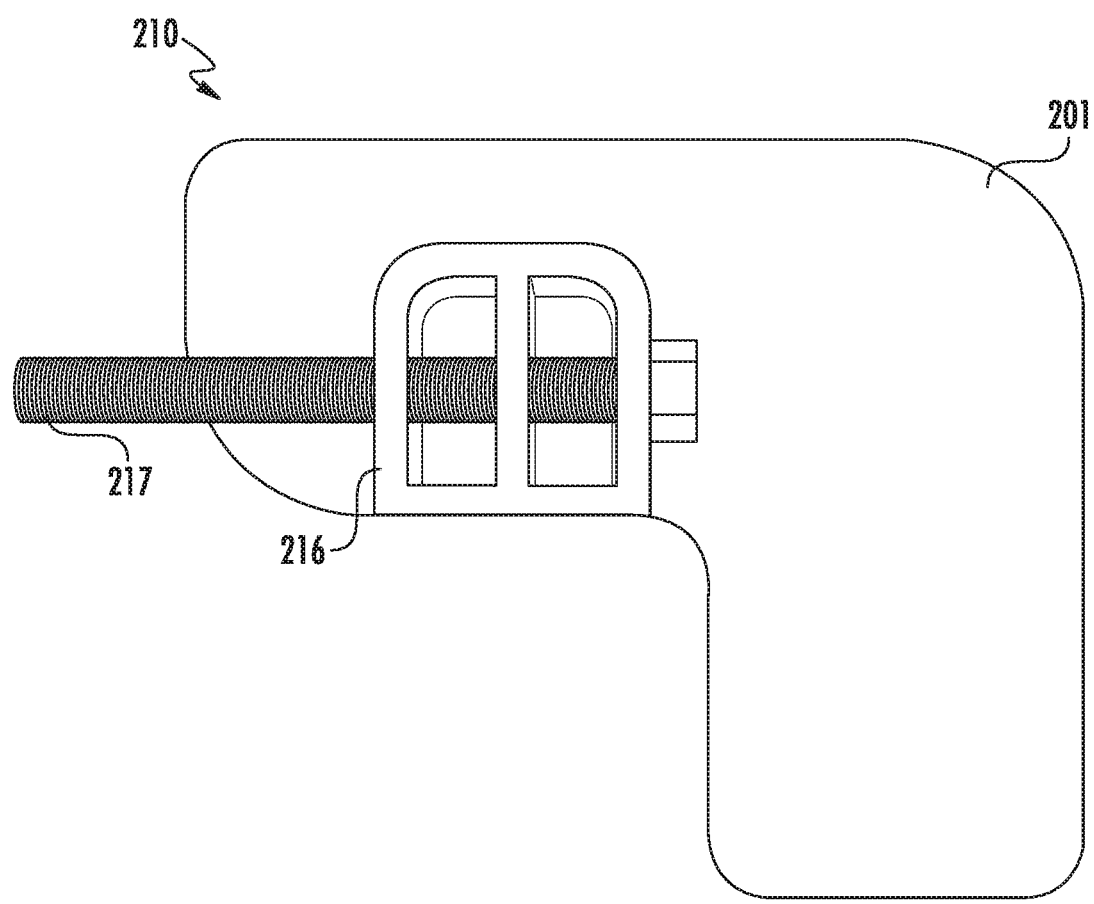
FIG. 12 is a front view of a hanging device including a grabber component attached to an attachment structure including a bolt.

FIG. 12 illustrates another embodiment of a hanging device 210 including a grabber component 201 and an attachment structure 216 that includes a bolt 217. Attachment structure 216 is one embodiment of a device that can be utilized to attach multiple different types of securement devices or machines directly to a hanging device 210. Other attachment components such as clamps, screws, pins, pegs, etc. as would be known to one of skill in the art can alternatively be utilized.

An attachment structure 216 can be utilized to attach any sort of mated securement device to the grabber component. Securement devices can include, without limitation, tables, clip boards, tool bags or other tool containment devices as are known in the art that can in turn hold or support another machine or tool. Alternatively, an attachment structure 216 can attach directly to a tool or a machine such as, without limitation, lights, computers (e.g., laptop computers or tablets), phones (land line phones or cell phones), radios, cameras, and so forth. The attachment structure can be removable from the grabber component so as to more easily attach specific securement devices. For instance, a hanging device can be provided with a variety of interchangeable securement devices and/or attachment structures, which can provide a wide variation in the types of tools and devices that can be held or supported by use of the hanging device. In addition, the interchangeable parts of a device can provide for the device to be altered so as to extend from either side of a metal stud with the securement device in the proper orientation for supporting the desired tool.

The hanging device can be quickly and easily installed in conjunction with a stud at a construction site. In general, the stud will be a metal stud that is formed with a back surface and two extending flanges on either side, though the hanging device may alternatively be removably secured to any device that includes flanges our ledges extending at a suitable width.

FIG. 13 illustrates a method for attaching a hanging device 410 to a stud 405, which is generally a metal stud. As can be seen in FIG. 13A, the hanging device 410 can be located between the two flanges 408, 409 of a stud 405 with the grabber component 401 flush against the back surface 415 of the stud 405.

Figure 13A:
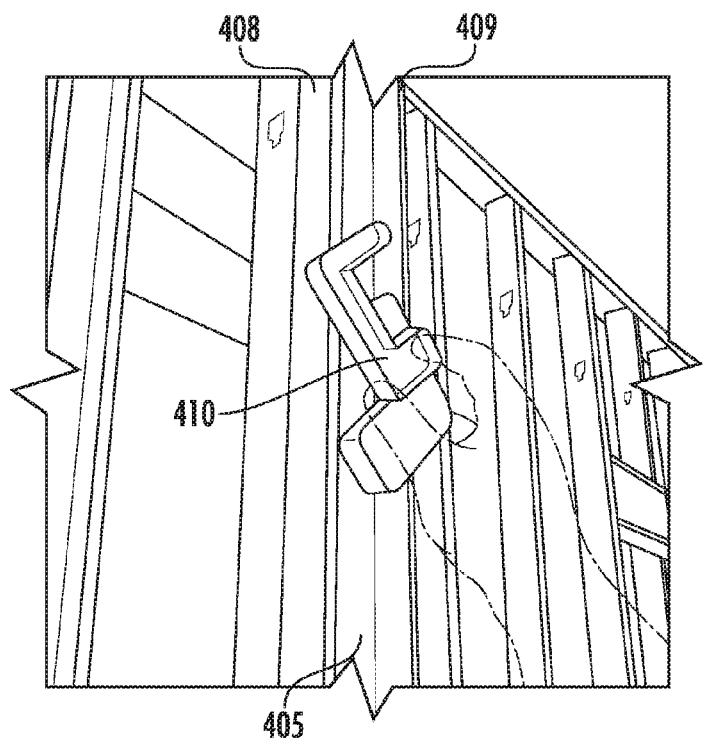
FIG. 13 illustrates a method for attached a hanging device to a stud including locating the grabber component between the flanges of a stud (FIG. 13A), rotating the device within the flanges (FIG. 13B) to a point where the grabber component is maintained via a tight friction hold (FIG. 13C) and also illustrates the device held in the stud and holding an electrical cord by use of a hook attached to the grabber component (FIG. 13D).
Figure 13B:
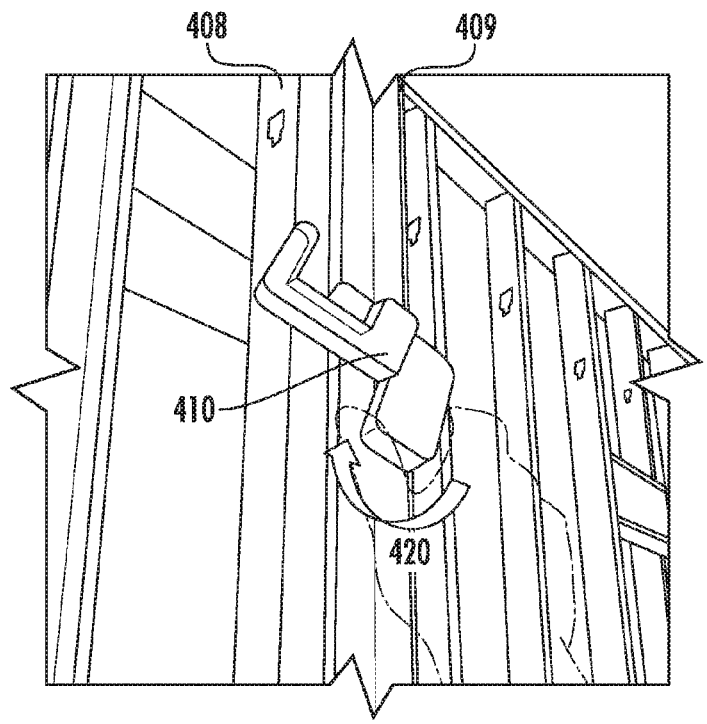
Figure 13C:
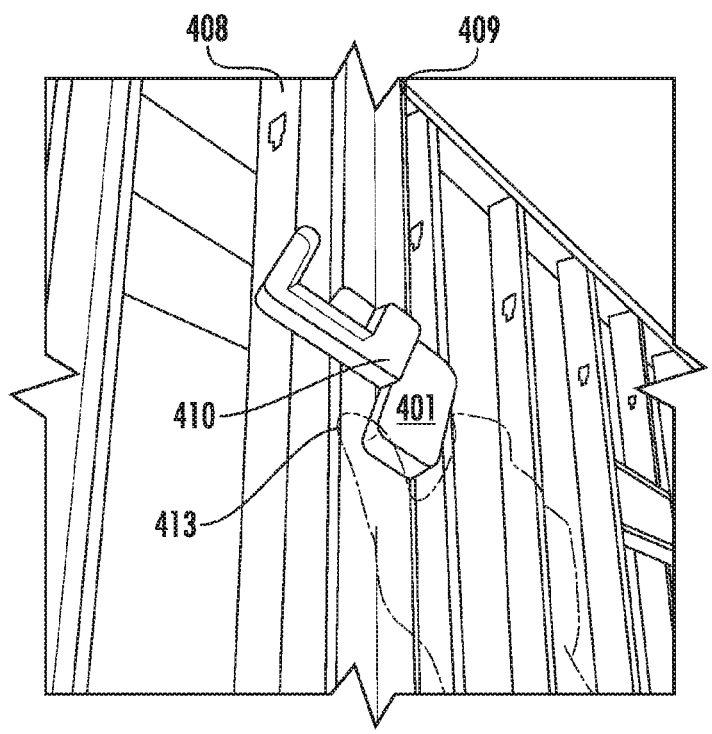
Figure 13D:
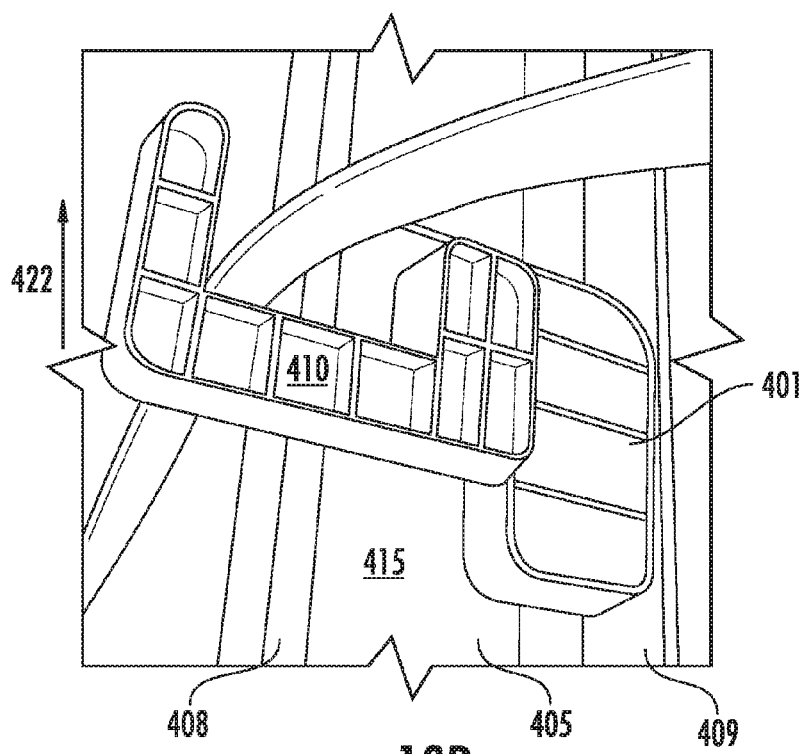

FIG. 13B illustrates the rotation of the grabber component 401 in a counter-clockwise direction as shown by the directional arrow 420 in FIG. 13B. The grabber component is rotated until it is tightly held within the web (i.e., between the flanges 408, 409) of the stud 405. As shown in FIG. 13C, a tighter fit may be made by pressing in on the corner 413 of the grabber component 401 during the rotation. The hanging device can then be locked securely in place and capable of supporting a device, such as an electrical cord as illustrated in FIG. 13D.

To remove the device, an upward force 422 (FIG. 13D) can be applied to the grabber component 401 so as to rotate the grabber component 401 in the opposite direction (e.g., clockwise) as was utilized while attaching the hanging device 410 to the stud.

Figure 14:
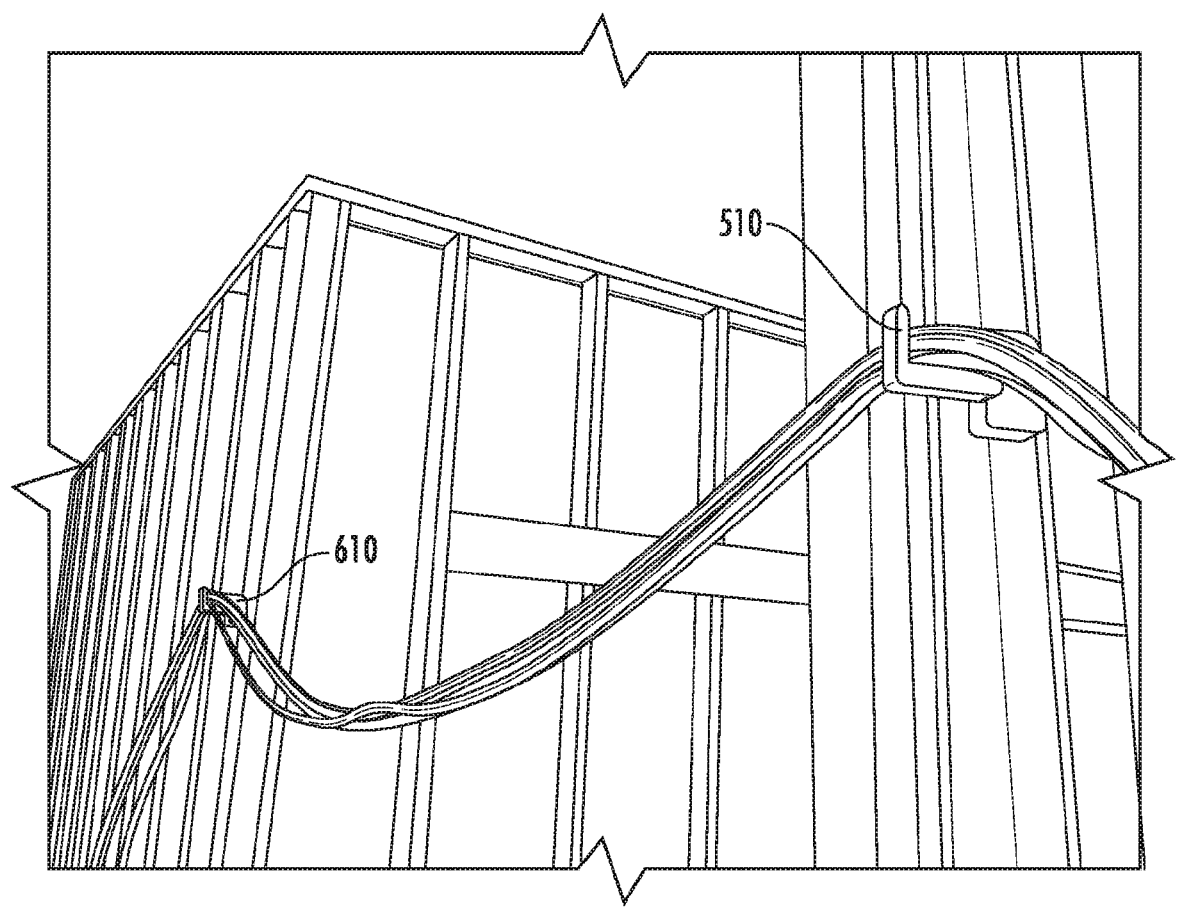
FIG. 14 illustrates a plurality of electrical cords supported by two devices on a construction site.

As illustrated in FIG. 14, multiple hanging devices 510, 610, can be utilized in conjunction with one another to safely and securely support materials at a job site, such as multiple electric cords as shown in FIG. 14. The hanging device can provide a safer, more organized construction site and can prevent damage to the tools and devices supported by the device. Moreover, as the hanging device is removable, a device can be used multiple times at multiple job sites, and can thus increase safety at the job site in an economical fashion.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A hanging device comprising:
a grabber component, the grabber component including a front surface and an opposite back surface and a first leg and a second leg, the first and second legs extending from a common point to a first end and a second end, respectively, the first leg having a first width between the common point and the first end, and the second leg having a second width between the common point and the second end, the first width being less than the second width, the grabber component being rotatable between two flanges of a stud so as to be removably securable to the stud with the back surface facing toward a surface of the stud and the front surface facing away from the surface of the stud and with the first leg width and the second leg width being parallel to the surface of the stud, and a hook attached to the front surface of the grabber component, the hook extending in a direction that is planar with the front surface of the grabber component and extending to a distance that is beyond the second end of the second leg of the grabber component, the hook being configured to temporarily support a device or tool at a construction site.

2. The hanging device of claim 1, wherein the hook is removably attached to the grabber component.

3. The hanging device of claim 1, wherein the grabber component has a shape of the letter 'L'.

4. The hanging device of claim 1, further comprising an attachment structure between the grabber component and the hook.

5. The hanging device of claim 4, wherein the attachment structure is removably attachable to the grabber component.

6. The hanging device of claim 4, wherein the attachment structure comprises a bolt, a clamp, a screw, a pin, or a peg.

7. The hanging device of claim 4, wherein the attachment structure is removably attachable to the hook.

8. The hanging device of claim 1, wherein the first width is from about 2.5 inches to about 3.5 inches.

9. The hanging device of claim 1, wherein the second width is from about 3 inches to about 4.5 inches.

10. The hanging device of claim 1, wherein the grabber component is an injection molded polymeric material.

* * * * *